United States Patent
Nakamura et al.

(10) Patent No.: US 7,538,771 B2
(45) Date of Patent: May 26, 2009

(54) MAIL DATA PROCESSING METHOD, MAIL SERVER, PROGRAM FOR MAIL SERVER, TERMINAL DEVICE AND PROGRAM FOR TERMINAL DEVICE

(75) Inventors: Tetsuya Nakamura, Otsu (JP); Teruo Onishi, Takatsuki (JP)

(73) Assignee: Omron Corporation, Kyoto (JP)

( * ) Notice: Subject to any disclaimer, the term of this patent is extended or adjusted under 35 U.S.C. 154(b) by 564 days.

(21) Appl. No.: 11/212,839

(22) Filed: Aug. 29, 2005

(65) Prior Publication Data
US 2006/0072162 A1    Apr. 6, 2006

(30) Foreign Application Priority Data
Aug. 31, 2004    (JP) .............................. 2004-251349

(51) Int. Cl.
| | |
|---|---|
| G06T 11/00 | (2006.01) |
| G06F 15/16 | (2006.01) |
| G06F 17/00 | (2006.01) |
| G09G 5/22 | (2006.01) |
| G06K 15/02 | (2006.01) |
| G06K 9/00 | (2006.01) |
| H04N 7/02 | (2006.01) |

(52) U.S. Cl. .................. 345/467; 345/551; 345/171; 345/559; 382/185; 382/189; 358/1.11; 358/402; 709/201; 709/203; 709/219; 715/200; 715/265; 715/752

(58) Field of Classification Search ......... 709/201–207, 709/213, 217–219, 238, 245; 715/200, 269, 715/262–265, 752–753; 358/1.11, 1.16, 358/1.15, 402; 382/185, 189, 305; 345/467, 345/471, 472.3, 171, 530–531, 536, 541, 345/551, 559, 418, 574
See application file for complete search history.

(56) References Cited

U.S. PATENT DOCUMENTS

| | | | |
|---|---|---|---|
| 7,197,705 B1* | 3/2007 | Nagae | 715/205 |
| 2001/0038687 A1* | 11/2001 | Toyoda et al. | 379/100.08 |
| 2002/0083140 A1* | 6/2002 | Shin et al. | 709/206 |
| 2002/0177418 A1* | 11/2002 | Kido | 455/90 |
| 2005/0150124 A1* | 7/2005 | Greenawalt et al. | 33/512 |
| 2006/0059231 A1* | 3/2006 | Takatori et al. | 709/206 |

* cited by examiner

*Primary Examiner*—Wesner Sajous
(74) *Attorney, Agent, or Firm*—Dickstein Shapiro LLP

(57) ABSTRACT

A mail server extracts a character unregistered in a portable terminal from received mail data and affixes the font data of the character concerned to the mail data or inserts a reading tag indicating the reading (pronunciation) of the character concerned into the mail data. The portable terminal additionally registers the font data affixed to the mail data into a font database before the received mail data are displayed. Furthermore, in the display processing of the mail data, a character for which the corresponding font data is unregistered is replaced by a no-font symbol and then displayed. Furthermore, the font of each character constituting the reading tag is read out and this font is displayed subsequently to the no-font symbol.

22 Claims, 11 Drawing Sheets

| CHARACTER | READING DATA | APPEARING FREQUENCY |
|---|---|---|
| 国 | くに こく | 2 |
| 慣 | な(れる) かん | 1 |
| ☆ |  | 2 |
| 礼 | れい | 1 |
| ♪ |  | 1 |

MAIL DATA PROCESSING METHOD, MAIL SERVER, PROGRAM FOR MAIL SERVER, TERMINAL DEVICE AND PROGRAM FOR TERMINAL DEVICE

CROSS REFERENCE TO RELATED APPLICATIONS

This application claims priority under 35 U.S.C. 119(a)-(d) and/or 365 to patent application JP 251349/2004, filed Aug. 31, 2004, which is incorporated by reference in entirety.

FIELD OF THE INVENTION

The present invention relates to a technique of processing electronic mail data of Japanese mails, and particularly to a technique of processing electronic mail data so that Japanese mails can be displayed to be sufficiently readable in a terminal device.

DESCRIPTION OF THE RELATED ART

Recently, in connection with propagation of use of electronic mails (i.e., e-mails, hereinafter "mail" or "mails") through cellular phones in Japan, it has been more realized to Japanese people even in foreign countries (i.e., countries other than Japan) that Japanese mails are received/transmitted by using cellular phones produced in these foreign countries. When Japanese words are input or displayed by a terminal device having no Japanese language environment, typically the terminal device is connected to a server for supplying font data through the Internet and font data of characters after conversion are transmitted from the server to the terminal device (JP-A-2002-278955; Patent Document 1).

Furthermore, by paying attention to the fact that Java (registered trademark) is installed in most of recent cellular phones, Japanese mail applications operating on Java (registered trademark) have been developed and it has been proposed to down-load these Japanese mail applications in cellular phones.

In a case where the supply service of font data is received through the Internet, with respect to an input operation of inputting Japanese language or a display operation of displaying received mails, the connection with the server must be kept until the processing is finished. In this case, when the electric wave state of the surrounding environment of a user is unstable, there occurs a problem that the communications are interrupted in the course of the processing and thus the processing itself is interrupted. Furthermore, since the font data of characters are images, and thus the data amount is increased. In connection with the increase of the data amount, the display and input speeds are reduced. In addition, the amount of packet communications is increased, and the connection is required to be kept for a long time, so that the communication cost is increased.

On the other hand, Japanese mail applications operating on Java (registered trademark) contain font data of Japanese language, and thus it is unnecessary to transmit font data from a server. However, there is a high probability that it is impossible to secure a memory amount for storing a sufficient amount of font data of Japanese language in overseas-produced (i.e., countries other than Japan) cellular phones which pay no attention to display, etc. of Japanese words, and thus it is required to limit the number of font data to be installed in an application. As a result, when a mail received at the cellular phone side contains characters for which corresponding font data are not registered, the characters cannot be displayed on the cellular phone, so that the reading of the mail is obstructed.

JP-A-10-240647 (Patent Document 2) discloses a technique which may be applied to solve the above problem concerning the Japanese mail applications. In a network system disclosed in the above publication, only standard font data for JIS first standard Kanji, etc. are registered in a terminal device, and only when it is necessary to display characters for which corresponding font data are not registered, the font data of the characters concerned are down-loaded from a server. According to the system of Patent Document 2, in the processing of successively displaying each character constituting mail data, every time an unregistered character appears, the corresponding font data are down-loaded and the character concerned is displayed. Such a method needs a long time to display a character and the processing efficiency is low.

Furthermore, as not clearly described in the Patent Document 2, it may be considered that font data to be additionally down-loaded are registered in a memory. In this case, the rate of the font data in the memory is increased every time an unregistered character is processed, so that it is difficult to apply this method to a device having a small memory amount such as an overseas produced cellular phone.

BRIEF SUMMARY OF THE INVENTION

The present invention enables Japanese mails to be displayed such that reading of the mails is not obstructed in a terminal device having no or limited display function of Japanese words, and also enables the display of the Japanese mails in a short time without connecting to the network.

In order to attain the above object, a mail data processing method according to a first aspect of the present invention is executed in a system comprising a terminal device in which a predetermined amount of font data of Japanese language are registered, and a mail server for distributing Japanese mails to the terminal device. The mail server is desired to be constructed by plural computers. However, the present invention is not limited to this style, and it may be constructed by a single computer.

It is desirable that the terminal device and the mail server as described above make communications with each other through a general-purpose hard-wired or wireless communication network such as the Internet or the like.

A cellular phone is known as one representative device of terminal devices as described above. However, the present invention is not limited to the cellular phone, and a portable type information processing device having a communicating function such as PDA or the like may be used. Font data with which a predetermined number of characters such as Kana characters, Kanji characters of generally high use, etc. can be displayed are registered in a memory of the terminal device. However, the number of registered characters is insufficient to display general Japanese documents. The characters constituting Japanese mails contain not only Kana characters, Kanji characters and numerals, but also symbols, alphabets of full size, pictographic characters, etc.

According to the mail data processing method of the first aspect of the present invention, a font database for registering a larger amount of font data than the font data registered in the terminal device and a management database for storing management data indicating a registration status of the font data of the terminal device are stored in a memory of the mail server in advance. In the mail server, mail data to be distributed are analyzed by using the management database to extract characters for which the corresponding font data are unregistered in a destination terminal device. In addition, when a character for which the corresponding font data is unregistered in the destination terminal device is extracted, the font data of the character thus extracted is read out from the font database and transmitted to the terminal device together with the mail data to be distributed.

At the terminal device side, a step A of reading out registered font data for every character contained in the received mail data and a step B of displaying a character image based on the registered font data thus read out are executed to display the content of the mail data, and also when font data are received together with the mail data, the processing of additionally registering the font data thus received is executed before the display processing of the mail data.

It is desired to register font data (for example, font data corresponding to Kana characters, symbols and all Kanji characters concerning first and second levels) the amount of which is set to the extent that display of general Japanese documents is not obstructed.

In the management database at the mail server side may be registered a list of characters for which corresponding font data are registered at the terminal device side, and a list of characters for which the corresponding font data are unregistered at the terminal device side. Each list of characters as described above may be constructed by arranging character codes of respective characters.

As described later, the management database is desired to be individually provided for every terminal device which can communicate with the mail server. However, the present invention is not limited to this style, and a common management database to the respective terminal devices may be set on the basis of font data which are standardly registered.

According to the mail data processing method of the first aspect, when mail data to be distributed contain characters for which the corresponding font data are unregistered in a terminal device, that is, contain characters which cannot be displayed by the display device, the mail server transmits the font data of the characters together with the mail data. At the terminal device receiving these data, the font data are additionally registered and then the mail data are displayed. Therefore, the mail data can be displayed with no obstruction.

Furthermore, according to this method, unregistered font data are identified at the mail server side, and then transmitted to the terminal device together with the mail data. Accordingly, it is unnecessary to make communications to achieve font data in the course of the display processing unlike the above-identified Patent Documents 1 and 2, so that the display can be executed in a short time. In the processing of displaying the mail data, steps A and B may be repeated for every character. On the other hand, it may be adopted that step A is executed on all the characters and then step B is executed on all the characters.

In one mode of the mail data processing method of the first aspect, at the mail server side, when a character for which the corresponding font data is unregistered is extracted from the mail data to be distributed, it is selected on the basis of the appearance frequency of the character concerned in the mail data whether the font data should be transmitted. For example, if the character concerned is used at plural times in the mail data, it is selected that the corresponding font data is transmitted. However, in the case of a character used only once in the mail data, no corresponding font data is transmitted.

In another mode of the first mail data processing method, at the mail server, when plural characters for which the corresponding font data are unregistered are extracted, characters for which corresponding font data are transmitted are selected under a condition that a transmission amount of the font data is within a predetermined value. For example, characters for which the corresponding font data are unregistered are successively selected in the extraction order, and when the transmission amount reaches the predetermined value in the course of the selection, the subsequent transmission of the font data for the residual characters is stopped.

When the upper limit value of the transmission amount of the font data is fixed, a fixed amount of font data can be transmitted irrespective of the amount of the main body of the mail data. When the upper limit value of the whole transmission amount containing the amount for the mail data is settled, the amount of transmissible font data can be varied in accordance with the amount of the main body of the mail data.

According to the above two modes, the amount of the data to be transmitted from the mail server to the terminal device is restricted, and the font data can be transmitted to the extent that no excessive load is imposed on the transmission.

In a third mode of the mail data processing method of the first aspect, the processing of transmitting a list of the additionally registered font data to the mail server is executed at the terminal device side. At the mail server, the management database is individually registered for every terminal device, and when an additionally registered list of the font data is received from the terminal device, the corresponding management database is renewed by using the list concerned.

According to the above mode, at the mail server, an individual management database is set for every terminal device, and these files can be renewed in accordance with the additional registration at the terminal device side. Accordingly, an unnecessary work of re-transmitting additionally registered font data can be avoided, and the efficiency of the transmission processing of data from the mail server can be enhanced.

The additionally registered list to be transmitted from the terminal device may be constructed by character codes corresponding to the additionally registered font data. In this case, only the character codes of newly additionally registered characters may be transmitted, however, the present invention is not limited to this mode.

For example, as described below, when other font data which are used at a less frequency are deleted in connection with the additional registration at the terminal device side, it is desired to transmit at least the character codes corresponding to the additionally registered font data and the deleted font data. Alternatively, when the additional registration is carried out, the character codes corresponding to all the font data which have been additionally registered until now may be transmitted.

According to a fourth mode of the mail data processing method of the first aspect, at the terminal device, the use frequency information is set to the additionally registered font data, and the use frequency information is renewed in association with use of the font data concerned in the display processing of the mail data. In addition, when the amount of the registered font data exceeds a predetermined limit value, font data whose use frequency is lowest is deleted. According to this method, font data which are additionally registered at the terminal device side, but hardly used afterwards can be deleted, so that the data amount of the additionally registered font data can be limited within a predetermined limit value. Accordingly, the mail data processing method described above can be executed in even a terminal device having a small memory amount. Furthermore, according to this method, font data of low use for display are successively deleted and thus the frequency at which the deleted font data are registered again can be reduced.

According to a mail data processing method of a second aspect of the present invention, a reading database for registering reading data of characters constituting Japanese language and a management database for registering management data indicating a registration status of font data in the terminal device are stored in a memory of a mail server in advance. In the mail server, mail data to be distributed are analyzed by using the management database, and characters for which the corresponding font data are unregistered in a destination terminal device are extracted. In addition, when a character for which the corresponding font data is unregistered is extracted, reading data corresponding to the character concerned is extracted from the reading database, and transmitted to the terminal device together with the mail data to be distributed. At the terminal device, step A and step B described above are carried out for every character contained in the received mail data to display the content of the mail data, and also when the reading data are received together with the mail data, the processing of reading out the registered font data of the character constituting the reading data is executed in step A for the character corresponding to the reading data.

In the above method, "reading data" are mainly data representing how Kanji characters (Chinese characters) are read (pronounced), however, they may be also applied to symbols and pictographic characters. Each reading data is desired to be represented by a Kana character sequence (Hiragana or Katakana), however, the present invention is not limited to this mode. For example, it may be represented by data of a Roman letter sequence. When the reading data is set to a Kana character sequence, it is required to register font data of Kana character sequences at the terminal device side. Furthermore, when the reading data is set to a Roman letter sequence, it is required to register font data of half-size alphabetic letters at the terminal device.

At the mail server, with respect to mail data containing characters for which the corresponding font data are unregistered at the terminal device side, a data file including reading data which are arranged in the arrangement order of unregistered characters can be created and transmitted together with the mail data. Alternatively, the mail data may be edited so that the characters in the mail data and the reading data are linked to one another, and the mail data after the edition may be transmitted. Furthermore, the mail data may be edited in such a format that tag-attached reading data is inserted before or after a character for which the corresponding font data is unregistered, and the mail data after the edition may be transmitted.

At the terminal device, when step A is executed on a character in the received mail data for which the corresponding font data is unregistered, the reading data corresponding to the character concerned from the reading data transmitted together with the mail data is extracted, and the registered font data of the characters constituting the reading data concerned (Kana, Roman letter or the like) are read out. Accordingly, in the step B for the character concerned, an image of a character sequence representing the reading (pronunciation) may be displayed in place of the original character image. When the reading (pronunciation) is displayed in place of the original character as described above, it is desired that a symbol or the like indicating that the display of the original character is replaced by the display of the reading (pronunciation) is displayed before or after the reading (pronunciation).

According to one mode of the mail data processing method according to the second aspect, at the mail server, when a character for which the corresponding font data is unregistered is extracted from mail data to be distributed, it is selected on the basis of the number of readings (pronunciations) associated with this character whether the font data should be transmitted or not.

In general, there is a case where a kanji character is read in a Chinese reading style and where the kanji character is read in a Japanese reading style, and thus two or more readings (pronunciations) may be set for each Kanji character with high probability. In such a case, if the number of the readings (pronunciations) is equal to two or less, the reading data may be transmitted. However, with respect to characters each of which has three or more readings (pronunciations), the reading data may not be transmitted. However, the present invention is not limited to this mode. For example, with respect to characters each of which has three or more readings (pronunciations), all the reading data may be transmitted. In this case, at the terminal device side, plural reading data are received for each character, and thus it is desired that these reading data are displayed while arranged or switched to one another.

When plural readings (pronunciations) exist for a character unregistered in the terminal device, the reading of the character may be specified by using a morphological analysis method at the mail server side and the reading thus specified may be transmitted to the terminal device.

Next, according to a mail data processing method according to a third aspect of the present invention, image information of symbols which are different for every character type is preset as non-font symbols indicating that there is no registered font data, and registered in the memory of the terminal device. At the terminal device, step A and step B are carried out for every character contained in received mail data to display the content of the mail data. In addition, when a character for which the corresponding font data is unregistered is processed in step A, the character type is identified from the character code of the character concerned, and the processing of reading out the no-font symbol corresponding to the character type thus identified is executed.

In the above method, it is unnecessary to carry out a specific processing in the mail server, and it would be sufficient only if the destination terminal device is identified from the header portion of the received mail data and the mail data are transmitted to the terminal device concerned. The no-font symbol which is registered in advance in the terminal device may be constructed as any image data, however, when font data (●■▲, etc.) of symbols are contained in data registered as Japanese font data.

The mail data is generally designed by arranging character codes such as JIS codes, etc. in the character arrangement order, the character type (kana character, kanji character, symbol, etc.) can be identified on the basis of the value indicated by the character code. The mail data processing method of the third aspect can be implemented by using the data construction described above.

According to the method described above, at the terminal device, when the received mail data contains some character for which the corresponding font data is unregistered, the character type can be identified from the character code of the character concerned in step A for the character concerned, and the image information of the no-font symbol corresponding to the character type can be read out. Accordingly, in step B for this unregistered character, the no-font symbol indicating the type of the character concerned can be displayed in place of the original character image.

According to the mail data processing method of the third aspect of the present invention, the no-font symbol indicating the character type can be displayed for a character for which the original character cannot be displayed, and thus user can estimate the character concerned on the basis of the relationship with the preceding and subsequent characters to the character concerned.

The mail data methods of the first to third aspects can be carried out individually, however, plural methods may be carried out in combination with one another. For example, the first and second methods may be combined with each other so that mail data appended with font data and reading data from the mail server are transmitted and the additional registration processing of font data and the processing displaying "reading (pronunciation)" are executed at the terminal device side.

A mail server for executing the mail data processing method of the first aspect comprises: a receiving unit for receiving mail data of a Japanese mail; a transmission control unit for carrying out the processing of identifying a destination terminal device by using a header portion of the mail data received by the receiving unit and then transmitting the mail data to the terminal device; a memory for storing a font database in which font data of Japanese language whose number is larger than the number of font data of Japanese language registered in the terminal device are registered, and a management database in which management data indicating a registration condition of the font data of the terminal device are registered; and an extracting unit for analyzing the mail data received by the receiving unit on the basis of the management database and extracting characters for which the corresponding font data are unregistered in the destination terminal device. When the extracting unit extracts a character for which the corresponding font data is unregistered in the destination terminal device, the transmission control unit reads out the font data of the character thus extracted from the font database, and transmits the read-out font data to the terminal device together with the mail data.

A program installed in the mail server described above may make a computer execute a first step of receiving mail data of a Japanese mail, a second step of identifying a destination terminal device by using a header portion of the mail data received in the first step and extracting from the mail data characters for which the corresponding font data are unregistered in the destination terminal device, by using management data indicating a registration condition of the font data of the terminal device, and a third step of transmitting the mail data passed through the processing of the second step to the destination terminal device. When a character for which the corresponding font data is unregistered in the destination terminal device is extracted in the second step, the third step of the program contains a step of reading out the font data of the character thus extracted from the font database in which a predetermined number of font data are registered, and transmitting the font data thus read out to the terminal device together with the mail data.

According to the program thus constructed, the receiving unit may be constructed by the first step of the program. Furthermore, the extracting unit and the transmission control unit may be constructed by the second and third steps of the programs, respectively.

Next, a mail server for executing the mail data processing method of the second comprises: a receiving unit for receiving mail data of a Japanese mail; a transmission control unit for carrying out the processing of identifying a destination terminal device by using a header portion of the mail data received by the receiving unit and then transmitting the mail data to the terminal device; a memory for storing a reading database in which reading data of various kinds of Japanese characters are registered, and a management database in which management data indicating a registration condition of the font data of the terminal device are registered; and an extracting unit for analyzing the mail data received by the receiving unit on the basis of the management database and extracting characters for which the corresponding font data are unregistered in the destination terminal device. When the extracting unit extracts a character for which the corresponding font data is unregistered in the destination terminal device, the transmission control unit reads out the reading data corresponding to the character thus extracted from the reading database, and transmits the read-out reading data to the terminal device together with the mail data.

A program installed in the mail server described above may make a computer execute a first step of receiving mail data of a Japanese mail, a second step of identifying a destination terminal device by using a header portion of the mail data received in the first step and extracting from the mail data characters for which the corresponding font data are unregistered in the destination terminal device, by using management data indicating a registration condition of the font data of the terminal device, and a third step of transmitting the mail data passed through the processing of the second step to the destination terminal device. When a character for which the corresponding font data is unregistered in the destination terminal device is extracted in the second step, the third step of the program contains a step of reading out the reading data of the character thus extracted from the reading database in which reading data of various kinds of Japanese characters are registered, and transmitting the reading data thus read out to the terminal device together with the mail data.

According to the above program, the receiving unit may be constructed by the first step of the program, and the extracting unit and the transmission control means may be constructed by the second and third steps of the program.

Next, a terminal device according to the present invention comprises a memory in which a predetermined amount of font data of Japanese language are registered, a communicating unit for making communications with a mail server at a remote place; and a display unit for displaying mail data received from the mail server by the communicating unit. The communicating unit may be constructed by hardware such as a wireless communication device or the like and a computer in which a program for transmitting/receiving data on the basis of a predetermined standard of protocol is installed. The display unit may be a device that can display character images, such as a liquid crystal panel or the like, and it is desired that the display unit has such a size that a predetermined length of Japanese character sequence can be displayed. Furthermore, the terminal device may be provided with a controller containing a computer.

The terminal device for executing the mail data processing method of the first aspect is equipped with a display control unit for executing step A and step B for every character contained in mail data of a Japanese mail to display the content of the mail data in response to reception of the mail data of the Japanese mail from the mail server by the communicating unit, and an additional registration unit for additionally registering font data into the memory before the processing of the display control unit when the receiving unit receives the font data concerned together with mail data. The display control unit and the additional registration unit may be set in the computer of the controller by a program installed in the controller.

A terminal device for executing the mail data processing method of the second aspect is equipped with a display control unit for executing step A and step B for every character contained in mail data of a Japanese mail to display the content of the mail data in response to reception of the mail data of the Japanese mail from the mail server by the communicating unit. When the receiving unit receives reading data together with the mail data, the display control unit is set to read out registered font data of a character constituting the reading data concerned in the step A for the character corresponding to the reading data. In this case, the display control unit may be also set in the computer of the controller by a program.

A terminal device for executing the mail data processing method of the third aspect is equipped with a display control unit for executing step A the step B for every character contained in mail data of a Japanese mail to display the content of the mail data in response to reception of the mail data of the Japanese mail from the mail server by the communicating unit. Image information different for every character type as a no-font symbol indicating that there is no registered font data is registered in the memory, and when a character for which the corresponding font data is unregistered is processed in step A, the display control unit identifies the character type of the character from a character code of the character concerned, and reads out image information of a no-font symbol corresponding to the character type thus identifies.

The display control unit of the terminal device described above may be also set in the computer of the controller by a program.

This program may contain a program for setting in the computer a registering unit for registering in the memory image information different for every character type as a no-font symbol indicating that there is no registered font data. The image information of the no-font symbol can be registered in the memory by the registering unit. The image information of each no-font symbol may be contained in the program. Furthermore, when a predetermined font data registered at the terminal device side is used as image information of a no-font symbol, the program for registering the no-font symbol may be constructed as a program for registering in the memory data for associating the font data corresponding to each no-font symbol with the character type.

The program installed in the controller of the terminal device described above is desired to be supplied to the terminal device through a communication line such as the Internet. Furthermore, it is desired that the program contains font data of Japanese language to be initially registered in the memory. With this construction, a display function of Japanese words can be installed in a terminal device having no display function of Japanese mails, and thus Japanese mails can be received and displayed.

Furthermore, the program may contain an input function of Japanese words. In this case, dictionary data for kana-kanji conversion may be contained in the program. However, when it is required to avoid increase of the data amount, it is desired to carry out the conversion processing using Japanese language font data. For example, a list of character images based on the Japanese language font data registered is displayed, and an operation of selecting a character on the display is carried out to input the selected character.

According to the present invention, even the terminal device having no or limited display function of Japanese language can display Japanese mails to the extent that reading of the Japanese mails is not obstructed. The display processing of Japanese mails can be efficiently performed under the non-communication state, so that the display speed of mails can be enhanced and the convenience and the economical efficiency at the terminal device side can be enhanced.

BRIEF DESCRIPTION OF THE DRAWINGS

FIG. 4 is a diagram showing an example of mail data;

FIG. 5 is a table showing an extraction result of font-uninstalled characters in mail data of FIG. 4;

FIG. 10 is a diagram showing a display example of mail data at the portable terminal.

DETAILED DESCRIPTION OF THE INVENTION

Preferred embodiments according to the present invention will be described.

Figure 1A:
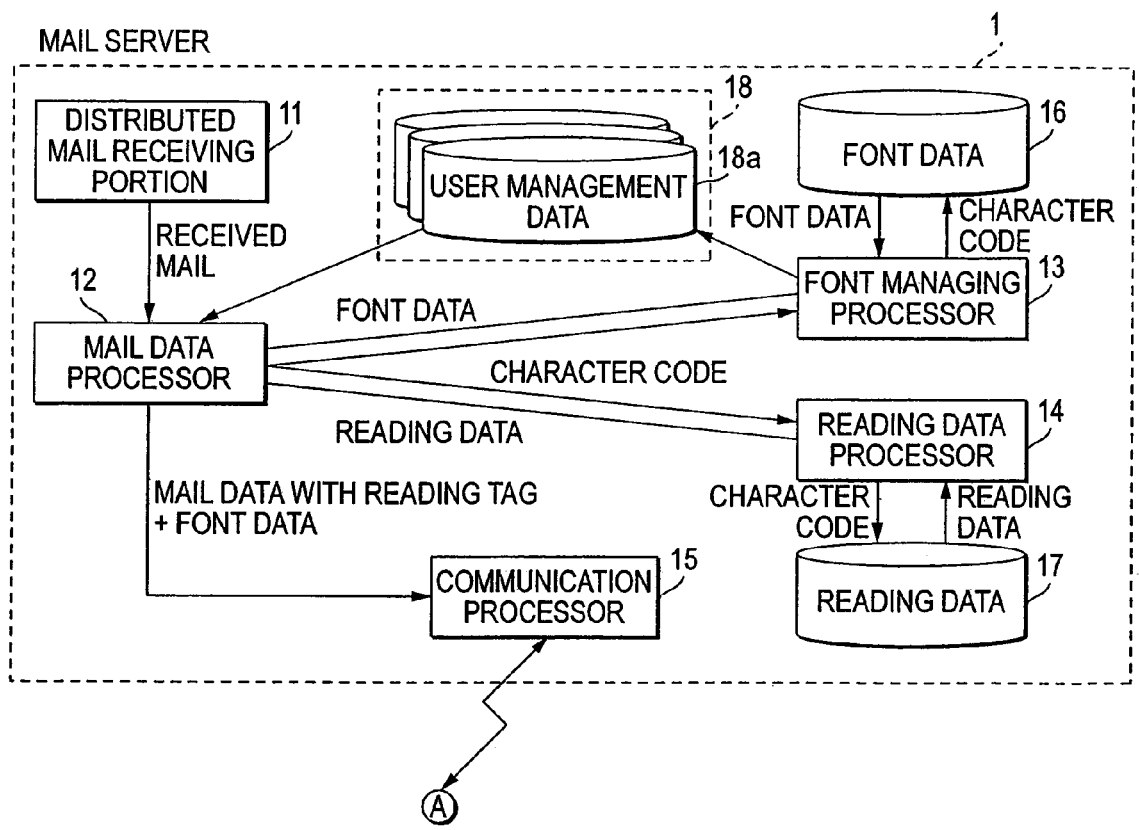
FIGS. 1A and 1B are functional blocks diagram showing a mail distributing system to which the present invention is applied.
Figure 1B:
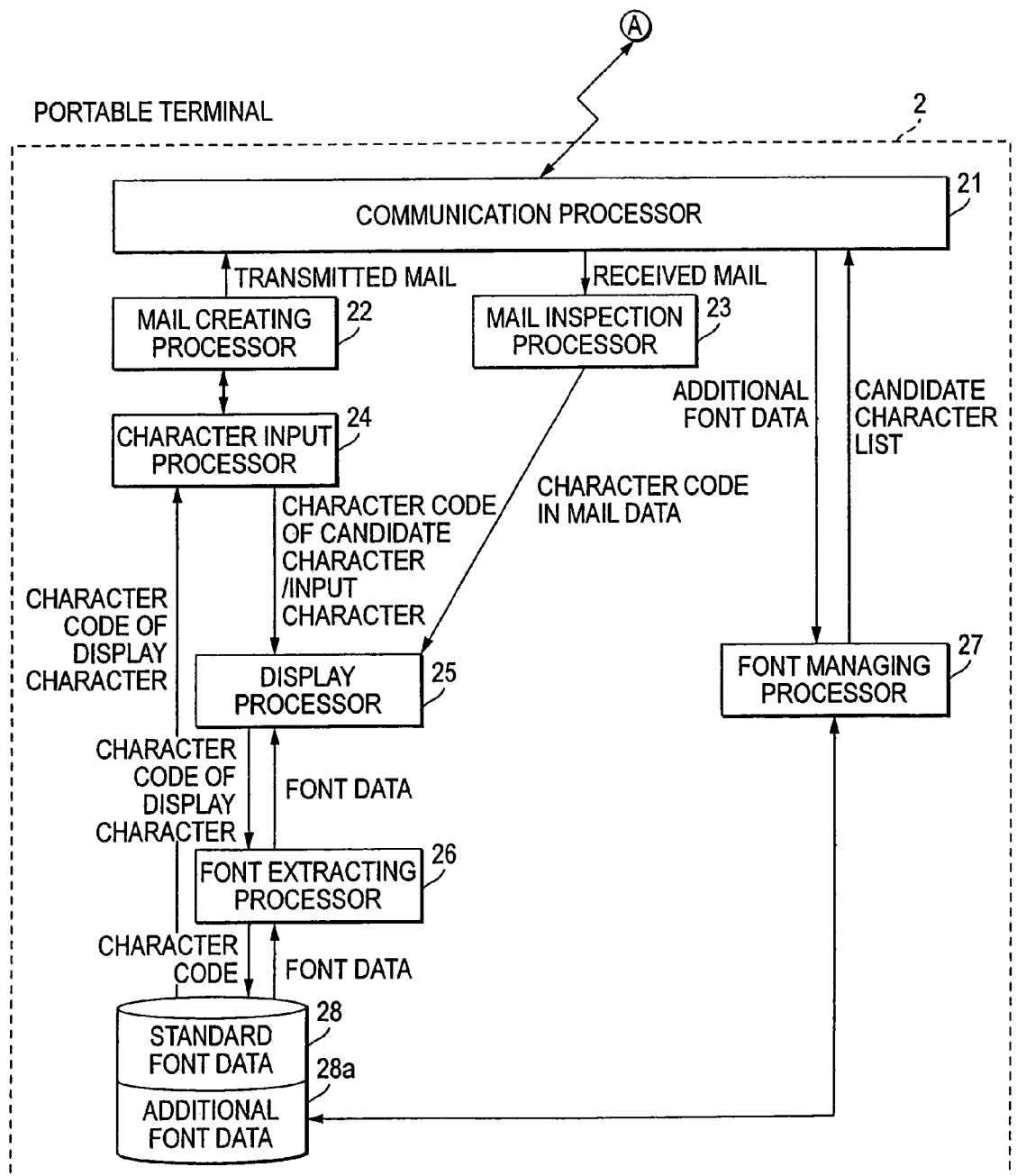

FIGS. 1A and 1B (hereinafter referred to collectively as "FIG. 1") are diagrams showing an example of the construction of a mail distributing system to which the present invention is applied.

The mail distributing system is constructed by a mail server 1 and plural portable terminals 2 (only one portable terminal is shown in FIG. 1) registered in the mail server 1; the mail server 1 and each of the portable terminals 2 communicate with each other through, for example, the Internet or a wireless cellular connection.

The portable terminal 2 is a device which has originally no processing atmosphere of Japanese language, such as a cellular phone or the like which is manufactured in countries other than Japan. In this embodiment, a program for processing Japanese mails is down-loaded into the portable terminal 2, whereby a function of creating Japanese mails and a function of displaying received Japanese mails are set in the portable terminal 2. Specifically, various processors such as a communication processor 21, a mail creating processor 22, a mail inspection processor 23, a character input processor 24, a display processor 25, a font extracting processor 26 and a font managing processor 27 are set by the above program. Furthermore, a font database 28 in which a predetermined amount of Japanese font data are registered is also down-loaded together with the program.

The mail server 1 executes the processing of transmitting a Japanese mail to the portable terminal 2 in which the download processing has been completed and transferring a mail transmitted from the portable terminal 2, and it is equipped with a distributed mail receiving portion portion 11, a mail data processor 12, a font managing processor 13, a reading (pronunciation) data processor 14, a communication processor 15, etc. Furthermore, a font database 16, a reading database 17, a font managing database 18, etc. are set as databases.

The respective processors 11 to 15 of the mail server 1 and the databases 16, 17 and 18 will be successively described.

Font data for displaying are stored for all the characters defined by present JIS codes (containing Japanese syllabary characters (Hiragana), katakana characters, kanji characters of first and second levels, symbols, etc.) are stored in the font database 16. The font data is constructed as an independent image file for every character, and each file is given a file name based on the character code of the corresponding character.

With respect to characters having "readings (pronunciations)" such as kanji characters, some of symbols, etc. out of characters registered in the font database 16, hiragana character sequences representing the readings of the characters concerned (hereinafter referred to as "reading data") are stored in the reading (pronunciation) database 17. Specifically, each of the reading data corresponds to an arrangement of character codes each of which corresponds to each hiragana character constituting the hiragana character sequence, and each reading data is associated with the character codes of the corresponding characters. Furthermore, with respect to a character having plural readings (pronunciations), the reading data corresponding to all the readings are stored.

An individual data file 18*a* is stored in the font management database 18 for every portable terminal 2 registered in the mail server 1. In the data file 18*a* (hereinafter referred to as "user-based management data file 18*a*") is stored a list of characters for which the corresponding font data are registered in the corresponding portable terminal 2 (hereinafter referred to as "font-installed characters").

Specifically, this character list is constructed by arranging the character codes of the respective characters. A candidate character list and an additional registration list created at the portable terminal 2 side as described later are likewise constructed by arranging character codes.

The distributed mail receiving portion 11 serves to receive a Japanese mail from any information processor (a cellular phone, a personal computer or the like). The reception processing of the receiver 11 contains the processing of assembling packet-based data into original mail data, etc.

The mail data processor 12 is supplied with the mail data to be distributed from the distributed mail receiving portion 11. First, the mail data processor 12 accesses the font data management database 18 on the basis of the destination data of a header portion of the mail data thus supplied, and specifies a user-based management data file 18*a* associated with a portable terminal to which the mail is addressed (hereinafter referred to as "destination terminal 2"). The characters constituting the mail data are successively noted, and each noted character is collated with the character list in the user-based management data file 18*a* to identify whether the noted character concerned is registered in the destination terminal 2. Here, if the noted character is identified as a character unregistered in the destination terminal 2 (hereinafter referred to as "font-uninstalled character"), the mail data processor 12 supplies the character code of the font-uninstalled character concerned to the font managing processor 13 and the reading data processor 14.

The font managing processor 13 accesses the font database 16 on the basis of the character code received from the mail data processor 12, and reads out the corresponding font data. The font data thus read out are delivered to the mail data processor 12.

Furthermore, when an additional registration list described later is transmitted from the portable terminal 2 side, the font managing processor 13 renews the content of the user-based management data file 18*a* corresponding to the portable terminal 2 as the list transmission source by using the additional registration list.

The reading data processor 14 searches the reading database 17 on the basis of the character code received from the mail data processor 12, and extracts the reading data of the noted character. This reading data is also delivered to the mail data processor 12.

The mail data processor 12 edits the mail data so that the font-uninstalled characters are readable at the destination terminal side 2 under the condition that the transmission amount of the data to the destination terminal 2 does not exceed a predetermined limit value. This edition is carried out by the following two methods. One method is a method of affixing the font data of the font-uninstalled characters delivered from the font managing processor 13 to the mail data. As described above, each font data corresponds to an image file of each character, and thus the respective font data can be affixed to the mail data character by character as in the case of the normal file affixing processing for mail data.

The second method of the edition processing is to contain reading data in the mail data. In this embodiment, data added with a tag symbol <> (hereinafter referred to as "reading tag") is created before and after a hiragana character sequence constituting reading data, and this reading tag is inserted after the corresponding font-uninstalled character in the mail data. For example, when a character sequence "私の案では"exists in mail data and "案"in the character sequence is a font-uninstalled character, a reading tag is inserted like "私の案<an>では".

The mail data edited by the mail data processor 12 is delivered to the communication processor 15. The communication processor 15 divides the mail data received on a packet basis, and successively transmits each of the packets according to the communication protocol.

Next, the construction and function of the portable terminal 2 will be described.

Font data for a limited number of characters containing not only hiragana characters and katakana characters, but also kanji characters, symbols, etc. of generally high use are stored in the font database 28 at the down-load time of the portable terminal 2 side. The initially registered font data will be hereinafter referred to as "standard font data". Each standard font data is constructed as an image data file for which the character code of the corresponding character is set as a file name.

Furthermore, the font database 28 is provided with an area 28*a* for additionally registering font data transmitted from the mail server 1 while the font data are affixed to the mail data (hereinafter referred to as "additional registration area 28*a*").

Furthermore, the standard font data and the additional font data in the font database 28 are stored in association with the use frequencies thereof. The use frequency is renewed for every time the corresponding font data is read out for display. Furthermore, the additional font data in the additional registration area 28*a* is associated with data indicating the order of storage.

The display processor 25 is supplied with the character code of a character to be displayed from the character input processor 24 or the mail inspection processor 23, and supplies the code to the font extracting processor 26. The font extracting processor 26 accesses the font database 28 by using the character code thus supplied, and reads out the font data of the character to be displayed. The display processor 25 is supplied with the font data from the font extracting processor 26, and outputs the font data to the display unit (not shown).

Through the above processing, the image of the character to be displayed can be displayed on the display unit. The renewal processing of the use frequency of each font data is executed by the font extracting processor 26.

The mail creating processor 22 is started in accordance with the operation of creating a transmission mail, and supplied with an input character from the character input processor 24 to assembly mail data. The mail data thus assembled is supplied to the communication processor 21.

The communication processor 21 executes the processing of transmitting mail data created by the mail creating processor 22 or the like to the mail server 1 and the processing of receiving mail data transmitted from the mail server 1. In the transmission processing, the processing of packeting mail data and other processing are executed. In the reception processing, the processing of successively receiving packet-based mail data for every packet and assembling the original mail data and other processing are carried out. The mail data thus transmitted/received are stored in a transmission folder or a reception folder in a memory (not shown).

The mail inspection processor 23 is started in response to a mail inspecting operation to read out mail data selected from the reception folder by the user. The character codes of respective characters constituting the mail data are successively supplied to the display processor 25 to thereby display the content of the mail data on the display unit.

The display processor 25 has a function of replacing a character by the no-font symbol corresponding to the character type of the character concerned when the font data corresponding to the character code of the character concerned received from the mail inspection processor 23 cannot be read out.

The character codes used in the mail communications are generally JIS codes. In the JIS codes, the range of values of codes is defined for every character type, and thus it is possible to identify the character type on the basis of the value of the character code. After the character type is identified according to the above method, the display processor 25 reads out font data of a predetermined symbol in accordance with the identification result, and displays the image based on the font data concerned in place of the original character image.

When font data are affixed to the received mail data, the communication processor 21 executes the processing of supplying the font data to the font managing processor 27. The font managing processor 27 executes the processing of registering the font data into the additional registration area 28a of the font database 28.

Furthermore, after executing the additional registration processing of the font data, the font managing processor 27 reads out the character codes of the font data registered in the additional registration area 28a, and creates an additional registration list. The additional registration list created here is delivered to the communication processor 21, and then transmitted to the mail server 1. The mail server 1 receiving this transmission executes the processing of renewing the corresponding user-based management data file 18a by the font managing processor 13. That is, the user-based management data file 18a of the mail server 1 is also rewritten every time the additional registration processing of the font data is executed at the portable terminal 2 side. Accordingly, the processing of extracting the font-uninstalled characters described above can be executed with high precision at the mail server 1 side. Dictionary data for kana-kanji conversion is installed in most of devices having a Japanese input function. However, the portable terminal 2 of this embodiment is a device which originally has no processing function of Japanese language, and thus it does not have sufficient memory to install the dictionary data. Therefore, in this embodiment, a character is input according to a method of displaying a candidate list of input characters by using font data and selecting the character on the display screen. Furthermore, in this embodiment, the efficiency of the character input is enhanced by arranging the input candidate characters in the use frequency order. The character input processing to create a mail will be briefly described.

The character list of the input candidates (hereinafter referred to as "candidate character list") is constructed by arranging the character codes of the respective characters read out from the font database 28 in the use frequency order, and it is created by the character input processor 24. The character input processor 24 supplies the candidate character list thus created to the display processor 25. The display processor 25 successively supplies the character codes in the candidate character list to the font extracting processor 26, and also is supplied with the font data of each character from the font extracting processor 26. The display processor 25 outputs these font data to the display unit to thereby create a list display frame of the candidate character list.

When the character selecting operation on the list display frame of the candidate character list is carried out, the character input processor 24 outputs the character code of the selected character to the mail creating processor 22 and the display processor 25, whereby one input character is settled and installed in the mail data, and also displayed on the display unit. By repeating the processing as described above, the characters are successively input one by one and finally the mail data are assembled.

Figure 2:
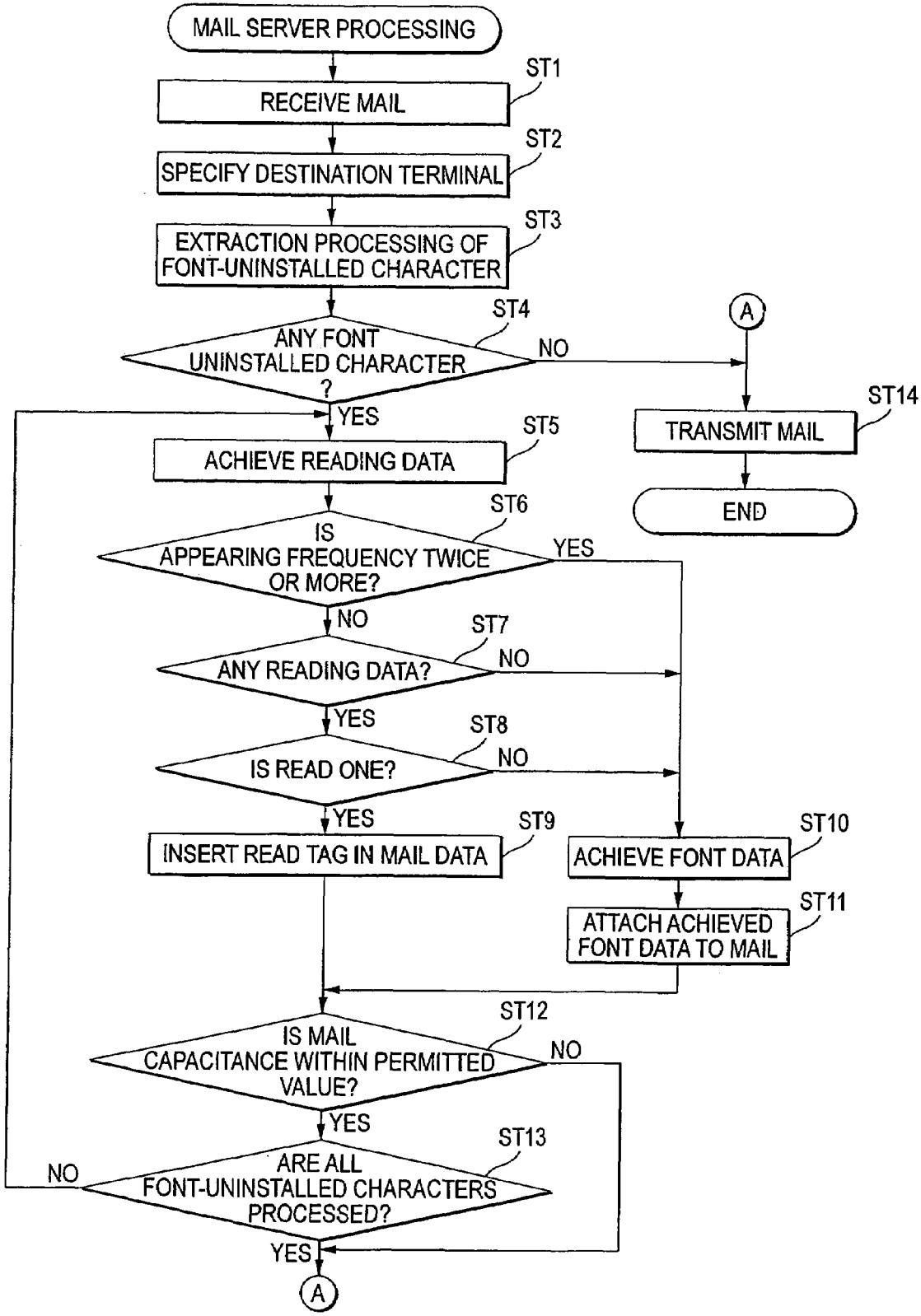
FIG. 2 is a flowchart showing the main flow of the processing of a mail server.
Figure 3:
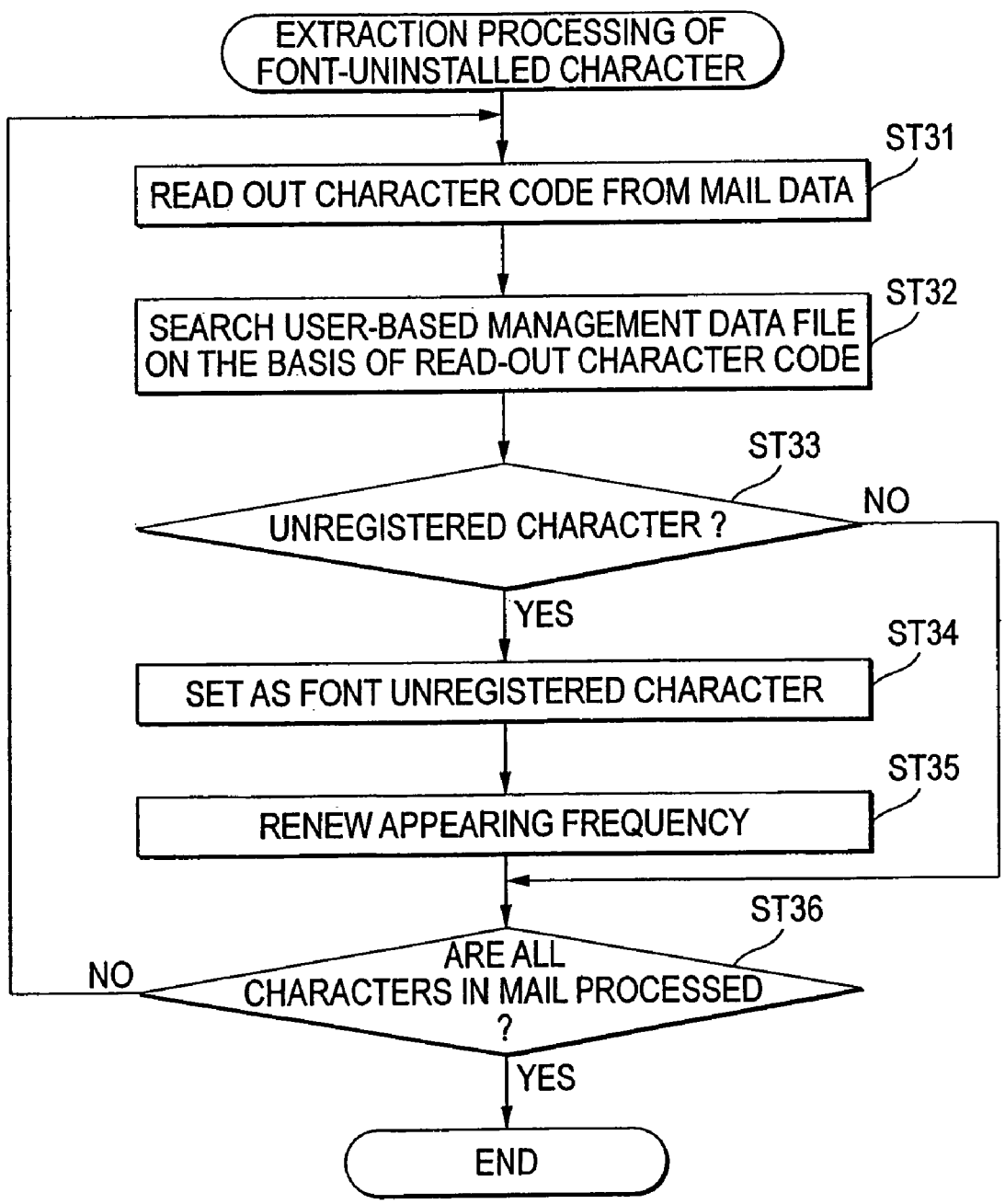
FIG. 3 is a flowchart showing the flow of extraction processing of font-uninstalled characters.

FIG. 2 shows the processing procedure when the mail server 1 processes one Japanese mail. FIG. 3 shows the detailed processing procedure of ST3 of FIG. 2 ("ST" represents an abbreviation of step).

FIG. 4 shows an example of mail data received at the mail server 1. In this example, a character surrounded by a rectangular frame in FIG. 4 is assumed to be a font-uninstalled character. FIG. 5 is a table showing an extraction result of font-uninstalled characters in connection with the mail data of FIG. 4. The table of FIG. 5 is generated in the process of the processing of FIG. 2, and stored in a working memory of the mail server 1.

The detailed processing of the mail server 1 will be described along the flow shown in FIGS. 2 and 3 with reference to FIGS. 4 and 5.

First, when receiving a Japanese mail addressed to a registered portable terminal 2 in ST1 of FIG. 2, the mail server 1 specifies the destination terminal 2 by using the address data described at the header portion of this mail in ST2. In ST3, the processing of extracting font-uninstalled characters from the mail data is executed. This extraction processing will be described hereunder with reference to FIG. 3.

In the extraction processing of the font-uninstalled characters of FIG. 3, attention is paid to a first character in the mail data and the character code of the character concerned is read out (ST31). In ST32, the user-based management data file 18a corresponding to the destination terminal 2 is searched on the basis of the character code thus read out. If the noted character is a font-installed character, the character code is registered in the user-based management data file 18a. In this case, the judgment of ST33 is "NO", and the subsequent steps ST34 and ST35 are skipped.

On the other hand, if the character code of the noted character is not registered in the user-based management data file 18a, the processing goes from ST33 to ST34, and the noted character is set as a font-uninstalled character. In the ST35, the appearance frequency of the font-uninstalled character concerned is renewed. In this renewal processing, an initial value "1" is set to a character which appears first.

The above processing is repetitively carried out on all the characters in the mail in the same manner. Accordingly, each font-uninstalled character is stored in a registration area of "character" of the table of FIG. 5, and also the appearance frequency at which each font-uninstalled character appears in the mail data is stored in a registration area of "appearance frequency".

When the above processing is completed with respect to all the characters, the judgment of ST36 is "YES", and the processing goes to step ST4 of FIG. 2.

In ST4, it is judged whether some font-uninstalled character is extracted through the processing of ST3. Here, if the extraction number of font-uninstalled characters is equal to zero, the processing goes to ST14. In this case, the mail data are transmitted to the destination terminal 2 with the mail data at the reception time being kept unchanged.

On the other hand, if some font-uninstalled character is extracted, the processing of ST5 to ST12 is executed on each font-uninstalled character while each font-uninstalled character is successively noted.

In ST5, the reading data of each noted character is read out from the reading database 17 by using the function of the reading data processor 14. Here, the reading data thus read out is stored in a registration area of "reading" of the table of FIG. 5. If the noted character is not registered in the reading database 17, the registration area corresponding to the character concerned is kept empty.

Subsequently, the appearance frequency of the noted character is checked in ST6. If the appearance frequency is equal to twice or more, the judgment of ST6 is "YES", and the processing goes to ST10. In ST10, the font data of the noted character is read out from the font database 16 by using the function of the font managing processor 13. In subsequent ST11, the processing of affixing the read-out font data to the mail data is executed.

When the appearance frequency of the noted character is equal to once, the processing goes to ST7 to check the presence or absence of reading data. Furthermore, if there is some reading data of the noted character, the processing goes to ST8 and checks the extraction number of reading data.

If it is judged in ST7 that there is no reading data or if it is judged in ST8 that there are plural reading data, ST10 and ST11 are executed. On the other hand, if it is judged in ST8 that only one reading data exists, the processing goes to ST9. The reading data of the noted character is picked up from the table of FIG. 5 to create a tag, and the tag thus created is inserted after the noted character in the mail data.

As described above, one of the processing of reading out the font data and affixing the font data to the mail data and the processing of creating a reading tag and inserting the reading tag into the mail data is carried out on the font-uninstalled character being noted. When the processing is finished, the processing goes to step ST12, and the data amount of the mail data after the processing is compared with a predetermined limit value.

Here, the data amount to be compared is the whole amount of the mail data added with the font data and the reading tag. If this amount is within the limit value, the processing is returned to ST5 through ST13, and a next uninstalled character is noted, and the same processing is executed on the next character.

When the processing on all the uninstalled characters is finished (ST13 is "YES"), or when the amount of the mail data exceeds the limit value in the course of the processing (ST12 is "NO"), the processing goes to ST14, and at this time point the mail data are transmitted to the destination terminal 2.

When the processing of ST6 to ST13 is applied to the case of FIGS. 4 and 5, since "国"and "☆" appear twice, they are targeted to be subjected to the affixing processing of the font data. Furthermore, two reading data are extracted for "慣", it is likewise targeted to be subjected to the affixing processing of the font data. Furthermore, "♪" appears once, however, the reading data thereof is not extracted. Therefore, it is targeted to be subjected to the affixing processing of the font data.

On the other hand, "礼"appears once, and one reading data exists. Therefore, it is targeted to be subjected to the processing based on the reading tag.

The processing of ST6 to ST13 is carried out in the extraction order of the font-unregistered character. Therefore, when the amount of the mail data exceeds the limit value in the course of the processing, the subsequent font-unregistered characters are transmitted while the affixing of the font data and the setting of the reading tags are not carried out. However, in this embodiment, the limit value is set so that in the case of mail data having a standard amount, font data of plural characters can be affixed to the mail data. Accordingly, it may be considered that such a situation that mail data are transmitted without processing any font-unregistered character occurs hardly ever.

FIGS. 6 to 9 show the flow of the processing executed at the portable terminal 2. In these figures, each step executed at the portable terminal 2 is represented by "st" in order to avoid the confusion between the steps executed at the portable terminal 2 and the steps executed at the mail server 1 side.

Figure 6:
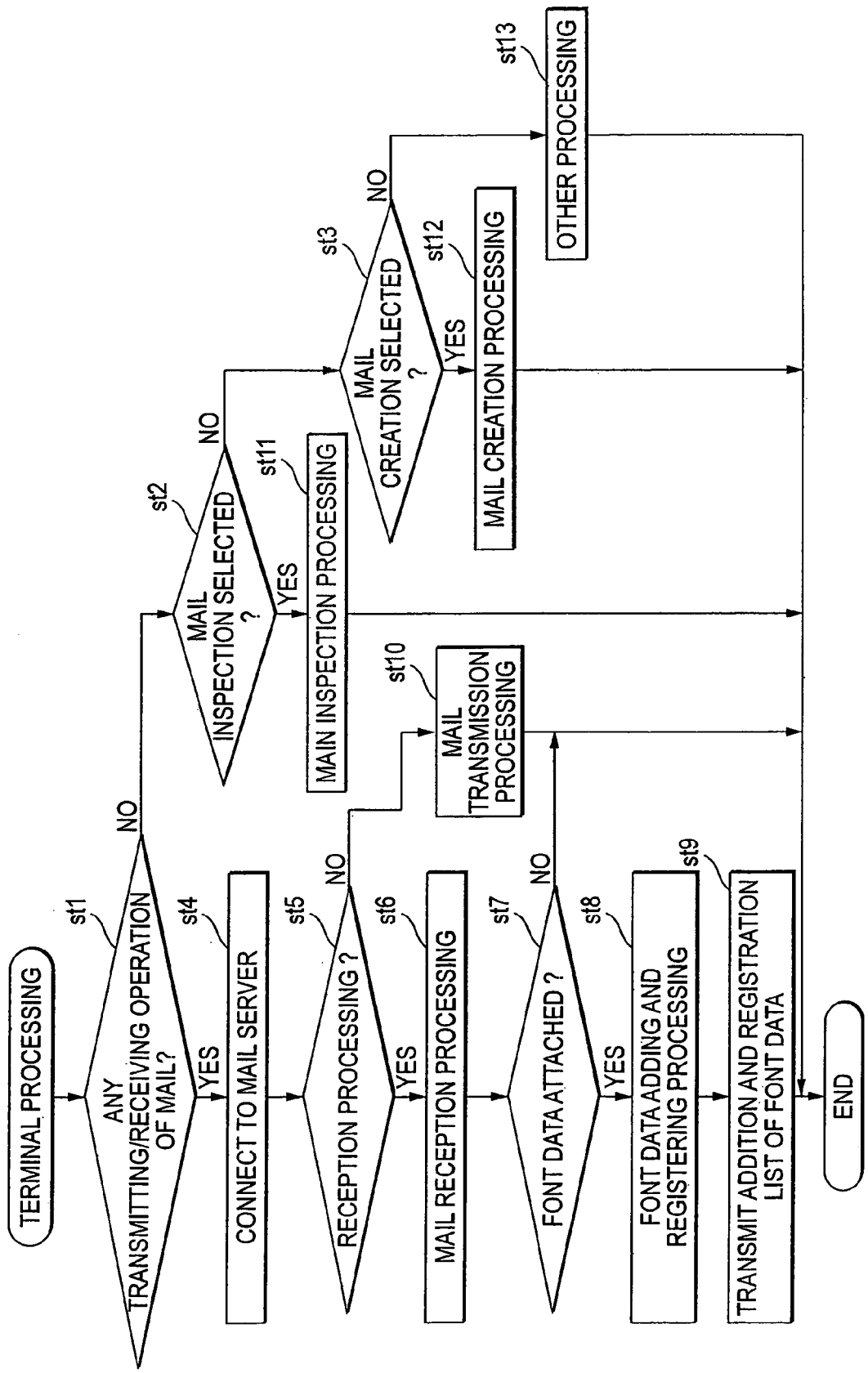
FIG. 6 is a flowchart showing the main flow of the processing at a portable terminal.

FIG. 6 shows the flow of the main processing in the portable terminal 2.

In the portable terminal 2, st13 (the processing relating to normal communication, etc.) is executed while checking the presence or absence of the operation relating to the mail processing in st1 to 3. In this processing flow, when there is an operation of instructing transmission or reception of a mail, the judgment of st1 is "YES", and the processing goes to step st4 to connect to the mail server 1.

When a mail is received, the processing goes from st5 to st6, and mail data stored in the mail server 1 are received from the mail server 1. In this reception processing, the processing of carrying out data transmission to inquire about the presence or absence of a new arrival mail to the mail server 1 and the processing of accepting a return mail from the mail server 1 are carried out.

When font data are affixed to the mail data received from the mail server 1, the judgment of st7 is "YES", and the processing goes to st8 to execute the processing of additionally registering the affixed font data in the font database 28. The details of this processing will be described later with reference to FIG. 7.

When the additional registration processing of the font data is executed, the processing goes to step st9. In st9, the portable terminal 2 accesses the additional registration area 28a of the font database 28 to create the additional registration list, and then transmits the additional registration list thus created to the mail server 1.

When a mail is transmitted, the processing goes from st5 to st10, and the mail data created in st12 described later are transmitted to the mail server 1. Furthermore, when mail data having no font data affixed thereto is received, the judgment of st7 is "NO" and the processing of st8, 9 are skipped.

When the operation of selecting the mail inspection processing is carried out, the judgment of st2 is "YES", and the processing goes to the mail inspection processing of st11. This processing will be described in detail with reference to FIGS. 8 and 9.

When the operation of selecting the mail creation processing is carried out, the judgment of st3 is "YES", and the processing goes to the mail creation processing of st12. In the character input processing for the mail creation, a candidate character list created from the font data is displayed as a list as described above, mail data are assembled character by character in accordance with the operation of selecting a character on the display frame of the candidate character list.

Next, the details of the additional registration processing of the font data of st8 will be described with reference to FIG. 7. In this processing, a first step is represented by st101.

Figure 7:
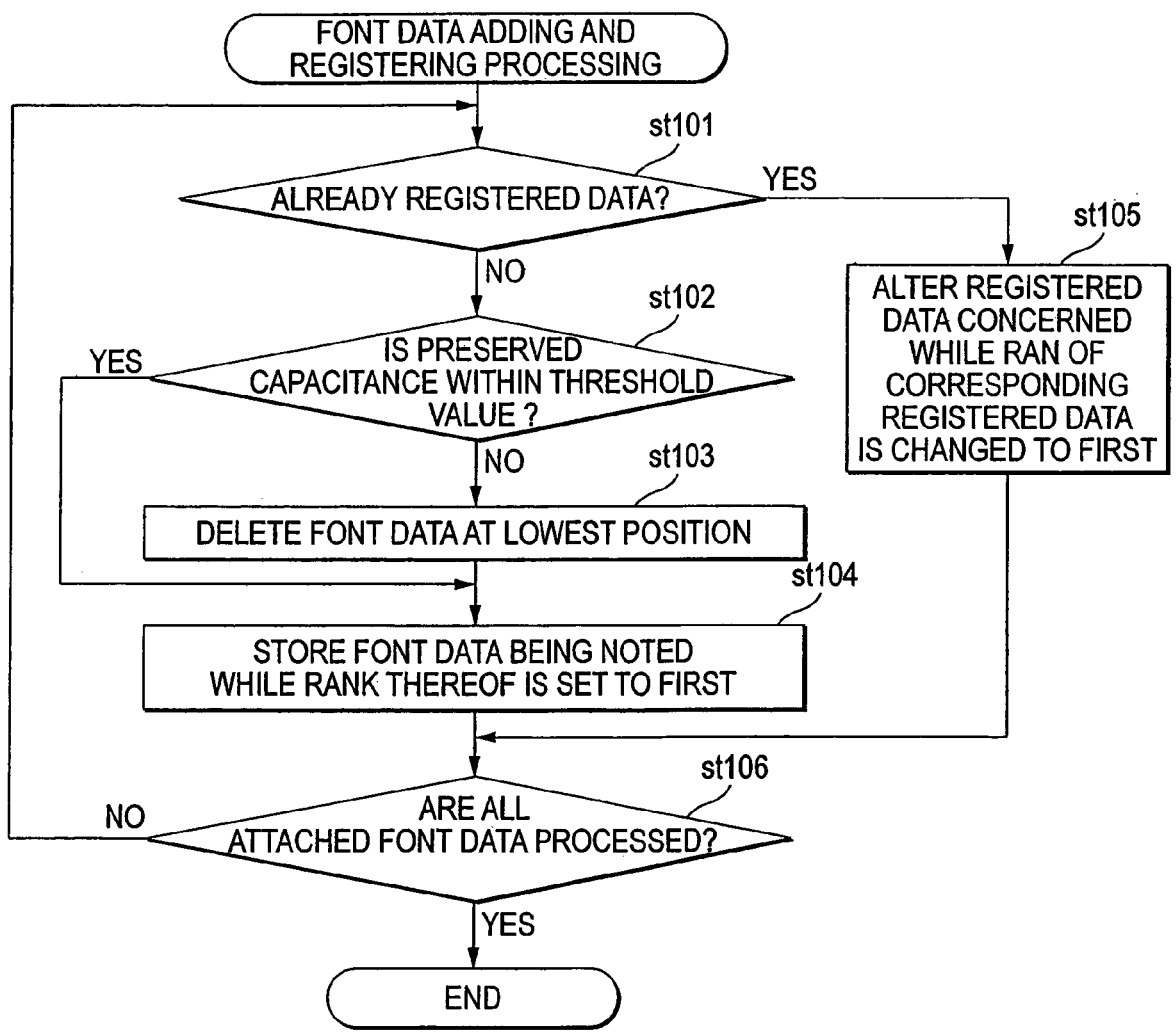
FIG. 7 is a flowchart showing the flow of additional registration processing of font data.

The processing flow of FIG. 7 is based on the assumption that plural font data are affixed to the mail data, and font data are successively noted one by one. In the first st101, it is judged whether font data being noted is registered in the font database 28. As described above, at the portable terminal 2, a registration list of additional font data is transmitted every time the portable terminal 2 is connected to the mail server 1. This is because when mail data edited before the user-based management data file 18a at the mail server 1 side is renewed on the basis of the above list are received, the font data which have been already registered may be affixed to the mail data. When the font data have been already registered, the judgment of st101 is "YES", and the processing goes to st105, and the processing of changing the storage rank order of the corresponding registered data in the font database 28 to the first is executed.

This storage rank order represents the registration order of the font data, and the data having the first rank is the latest registered data.

When the font data being noted is not registered in the font database 28, the judgment of st101 is "NO" and the processing goes to st102. In st102, it is judged whether the total amount of data registered in the additional registration area 28a of the font database 28 is within a predetermined threshold value. If the total amount of the data exceeds the threshold value, the processing goes from st102 to st103 to delete the font data of the lowest rank in the storage order. Thereafter, the processing goes to st104, and the font data being noted is stored in the additional registration area 28a while the storage rank thereof is set to the top. If the total amount of the data is within the threshold value, st103 is skipped.

When the above processing is executed on all the font data affixed, the judgment of st106 is "YES" and the processing is finished. Accordingly, all the unregistered data out of the font data affixed to the mail data are registered in the font database 28. Furthermore, when the amount of additional font data exceeds the fixed amount of the additional registration area 28a, the oldest registered data are deleted. Therefore, the memory resource of the portable terminal 2 can be prevented from being oppressed by the additional registration of the font data.

In the above-described embodiment, the font data which is lowest in the storage rank is deleted. However, in place of this manner, the font data having the lowest use frequency may be deleted. In this case, font data are successively deleted from font data which is displayed at a lower frequency, so that the frequency at which the deleted font data is re-registered can be reduced.

Next, the mail inspection processing of st11 will be described in detail with reference to FIGS. 8 and 9. In this processing, the first step is represented by st201.

Figure 8:
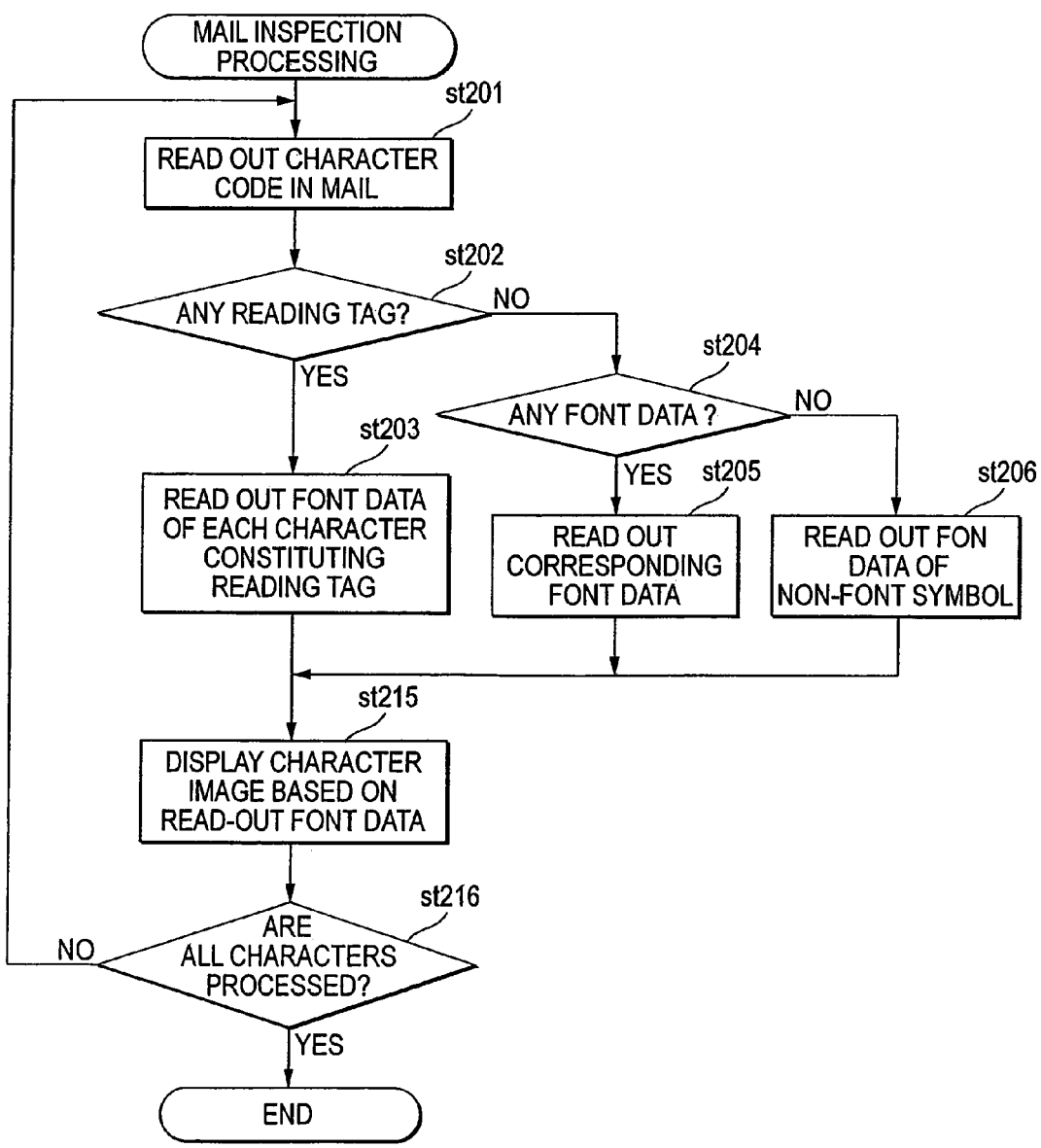
FIG. 8 is a flowchart showing the flow of mail inspection processing.
Figure 9:
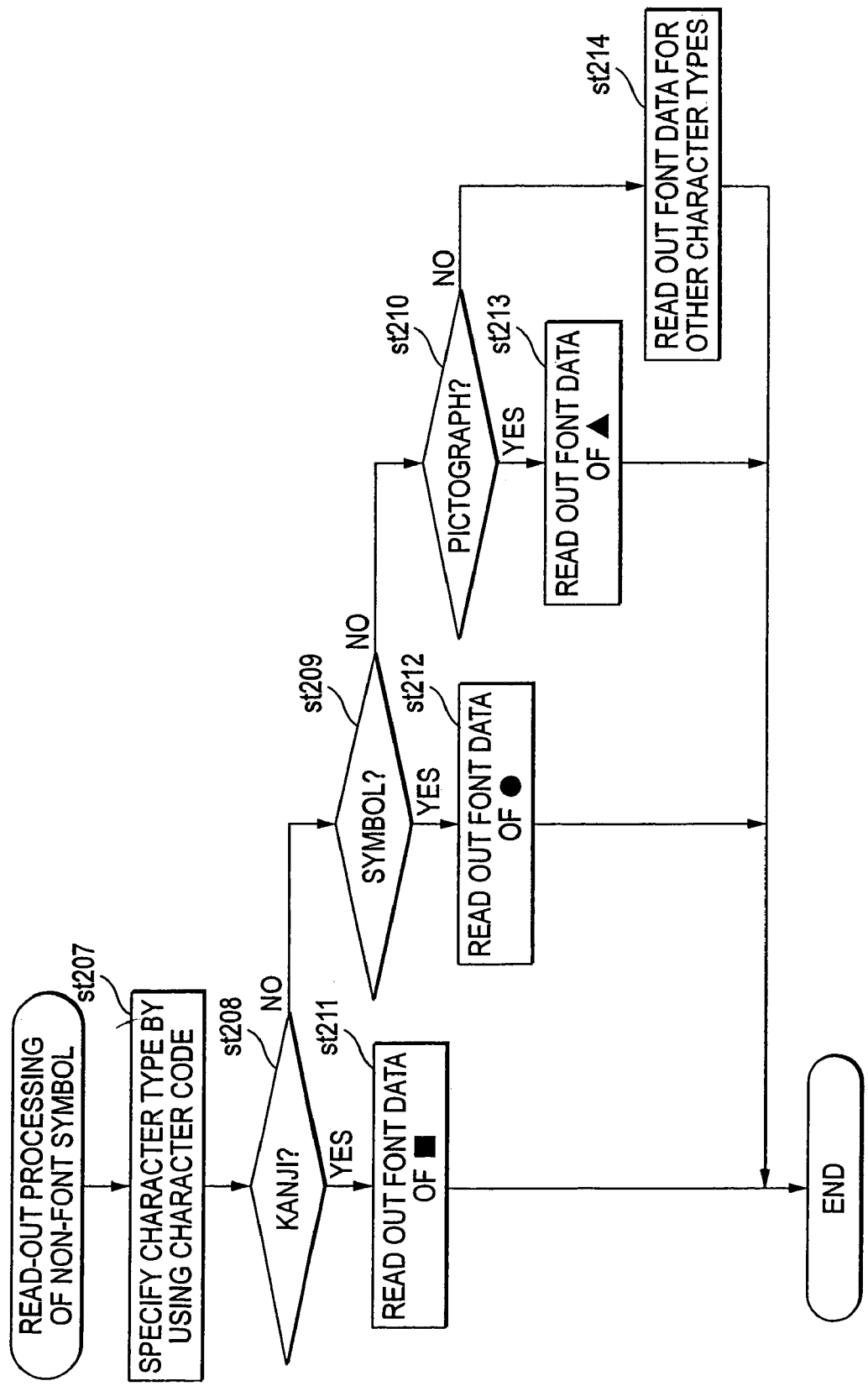
FIG. 9 is a flowchart showing the flow of read-out processing of a no-font symbol.

FIG. 8 shows the main flow of the mail inspection processing, and FIG. 9 shows the detailed flow of st206 of FIG. 8.

In this mail inspection processing, the character codes of all characters contained in the mail data are read out while the characters are successively noted. When the reading tag is contained in the mail data, the read-out processing of the character codes is executed for every plural character sequences constituting the reading tag. The details thereof will be described hereunder.

In st201, the character code of the noted character is read out from the mail data. In the next st202, it is judged from the value of the read-out character code whether the noted character is a head symbol "<" of the reading tag. Here, when the noted character is "<", the character code of the subsequent character is further read out and it is judged whether the reading tag is constructed or not.

When a predetermined number of subsequent character codes correspond to hiragana characters and the character code subsequent to these character codes is the back end ">" of a reading tag, the reading tag is constructed by a series of these characters. In this case, the judgment of st202 is "YES", and the processing goes to st203 to read out the font data of each character constituting the reading tag from the font database 28. In this embodiment, the font data of the tag symbols "<" and ">" are replaced by the font data of "("and ")", respectively.

When the character code of the noted character does not correspond to the tag symbol or when the character sequence after the symbol "<" does not constitute a reading tag, the judgment of st202 is "NO", and the processing goes to st204. In st204, the font database 28 is searched on the basis of the character code of the noted character. Here, when the font data corresponding to the character code is found out, the judgment of st204 is "YES", and the processing goes to st205 to execute the processing of reading out the corresponding font data.

On the other hand, when the font data corresponding to the character code of the noted character is not found out, the judgment of st204 is "NO", and the processing goes to st206 to execute the processing of achieving the font data of a no-font symbol.

The detailed processing is shown in FIG. 9. Briefly describing this processing, the character type is specified on the basis of the value of the character code of the noted character (st207), and font data of "■" if the character type is a kanji character, font data of "●" if the character type is a symbol, and font data of "▲" if the character type is a pictographic character are read out, respectively (st208 to s213). If it is judged that the character type is a character type (external character or the like) other than the above three character types, the processing goes to st214 to read out font data of a predetermined symbol prepared for other character types.

Returning to FIG. 8, when font data are read out in any one of the steps st203, st205 and st206, the processing goes to st215 to display a character image based on the read-out font data on the display unit. The display position of the image is controlled to be successively displaced piece by piece.

When all the characters in the mail data are displayed as described above, the judgment of st216 is "YES", and the processing is finished.

According to the procedure shown in FIGS. 8 and 9, with respect to characters for which the corresponding font data are registered, the corresponding font data are read out in st204, st205, and thus the characters themselves can be displayed. Furthermore, in this embodiment, the additional registration processing of font data of FIG. 7 is executed just after the mail is received. Accordingly, even when a font-uninstalled character is contained in the received mail, if the font data corresponding to the font-uninstalled character is affixed, the corresponding character can be displayed with no problem at the time point of the mail inspection processing.

On the other hand, with respect to characters for which the corresponding font data are unregistered, they are replaced by no-font symbols and displayed through the processing of st206 (st207 to st214). However, according to this embodiment, the character type is displayed with the no-font symbol, and thus the original character is easily estimated.

Furthermore, with respect to even characters for which fonts are unregistered, when a reading tag is affixed, reading data can be displayed subsequently to the no-font symbol through the processing of st202, 203. That is, the original character is not displayed, however, the reading (pronunciation) thereof can be displayed, so that the user can easily estimate the character.

FIG. 10 shows a display example of the mail data shown in FIG. 4 at the portable terminal 2 side.

In this example, with respect to three characters "国", "慣", "☆" out of the font-uninstalled characters, the font data are additionally registered, so that the characters themselves are normally displayed. Furthermore, with respect to "礼"the no-font symbol "■" and the reading "(rei)" are sequentially displayed because the reading tag is applied.

On the other hand, with respect to the residual font-uninstalled character "♪", only the no-font symbol "●" is displayed with displaying neither the original character nor the reading (pronunciation). This character "♪" has no reading data, and thus the font data should be transmitted. However, in this case, it may be estimated that if the font data of the finally-extracted font-uninstalled character "♪" is affixed, the amount of the mail data would exceed the limit value, so that no font data is affixed.

What is claimed as new and desired to be protected by Letters Patent of the U.S. is:

1. A mail data processing method executed in a system comprising a terminal device in which a predetermined amount of font data of Japanese language are registered, and a mail server for distributing Japanese mails to the terminal device, said method comprises:
    storing in a memory of the mail server in advance a font database for registering a larger amount of font data than the font data registered in the terminal device;
    storing in a memory of the mail server in advance a management database for storing management data indicating a registration status of the font data of the terminal device;
    in the mail server, analyzing mail data to be distributed by using the management database to extract characters for which the corresponding font data are unregistered in a destination terminal device;
    reading out from the font database and transmitting to the terminal device together with the mail data to be distributed when a character for which the corresponding font data is unregistered in the destination terminal device is extracted, the font data of the character thus extracted database;
    executing in the terminal device, a step A of reading out registered font data for every character contained in the received mail data;
    executing in the terminal device to display the content of the mail data, a step B of displaying a character image based on the registered font data read out; and
    executing before the display processing of the mail data in the terminal device when font data are received together with the mail data, registering the font data thus received.

2. The mail data processing method according to claim 1, further comprising the step of in the mail server, when a character for which the corresponding font data is unregistered is extracted from the mail data to be distributed, judging on the basis of the appearance frequency of the character concerned in the mail data whether the font data should be transmitted.

3. The mail data processing method according to claim 1, further comprising the step of in the mail server, when plural characters for which the corresponding font data are unregistered are extracted, selecting characters for which corresponding font data are transmitted under a condition that a transmission amount of the font data is within a predetermined value.

4. The mail data processing method according to claim 1, further comprising the steps of:
    individually registering in the mail server the management database for every terminal device, and
    when an additionally registered list of the font data is received from the terminal device, renewing in the mail server the corresponding management database by using the list concerned,
    wherein the processing of transmitting the list of the additionally registered font data to the mail server is executed in the terminal device.

5. The mail data processing method according to claim 1 further comprising the steps of:
    in the terminal device, setting the use frequency information to the additionally registered font data;
    renewing the use frequency information in association with use of the font data concerned in the display processing of the mail data; and
    deleting font data whose use frequency is lowest when the amount of the registered font data exceeds a predetermined limit value.

6. A mail data processing method executed in a system comprising a terminal device in which a predetermined amount of font data of Japanese language are registered, and a mail server for distributing Japanese mails to the terminal device, said method comprising the steps of:
    storing in a memory of a mail server in advance a reading database for registering reading data of characters constituting Japanese language;
    storing in a memory of a mail server in advance a management database for registering management data indicating a registration status of font data in the terminal device;
    analyzing in the mail server, mail data to be distributed by using the management database;
    extracting in the mail server when characters for which the corresponding font data are unregistered in a destination terminal device;
    extracting from the reading database when a character for which the corresponding font data is unregistered is extracted reading data corresponding to the character; database
    transmitting the reading data to the terminal device together with the mail data to be distributed;
    executing in the terminal device, a step for reading out registered font data and a step for displaying a character image based on read-out registered font data for every character contained in the received mail data to display the content of the mail data; and
    reading out the registered font data of the character when the reading data are received together with the mail data for the character corresponding to the reading data.

7. The mail data processing method according to claim 6, wherein
judging in the mail server, when a character for which the corresponding font data is unregistered is extracted from mail data to be distributed on the basis of the number of readings associated with this character whether the font data should be transmitted or not.

8. A mail data processing method executed in a system comprising a terminal device in which a predetermined amount of font data of Japanese language are registered, and a mail server for distributing Japanese mails to the terminal device, wherein:
presetting and registering in the memory of the terminal device image information of symbols which are different for every character type as non-font symbols indicating that there is no registered font data;
executing in the terminal device for every character contained in received mail data to display the content of the mail data a step A for reading out registered font data and a step B for displaying a character image based on a read-out registered font data;
identifying when a character for which the corresponding font data is unregistered is processed in the step A a character type from the character code of the character concerned; and
reading out a no-font symbol corresponding to the character type.

9. A mail server for distributing a Japanese mail to a terminal device in which a predetermined amount of Japanese font data are registered, comprising:
a receiving unit for receiving mail data of a Japanese mail;
a transmission control unit for carrying out the processing of identifying a destination terminal device by using a header portion of the mail data received by the receiving unit and then transmitting the mail data to the terminal device;
a memory for storing a font database in which font data of Japanese language whose number is larger than the number of font data of Japanese language registered in the terminal device are registered, and a management database in which management data indicating a registration condition of the font data of the terminal device are registered; and
an extracting unit for analyzing the mail data received by the receiving unit on the basis of the management database and extracting characters for which the corresponding font data are unregistered in the destination terminal device, wherein when the extracting unit extracts a character for which the corresponding font data is unregistered in the destination terminal device, the transmission control unit reads out the font data of the character thus extracted from the font database, and transmits the read-out font data to the terminal device together with the mail data.

10. A mail server for distributing a Japanese mail to a terminal device in which a predetermined amount of Japanese font data are registered, comprising:
a receiving unit for receiving mail data of a Japanese mail;
a transmission control unit for carrying out the processing of identifying a destination terminal device by using a header portion of the mail data received by the receiving unit and then transmitting the mail data to the terminal device;
a memory for storing a reading database in which reading data of various kinds of Japanese characters are registered, and a management database in which management data indicating a registration condition of the font data of the terminal device are registered; and
an extracting unit for analyzing the mail data received by the receiving unit on the basis of the management database and extracting characters for which the corresponding font data are unregistered in the destination terminal device, wherein when the extracting unit extracts a character for which the corresponding font data is unregistered in the destination terminal device, the transmission control unit reads out the reading data corresponding to the character thus extracted from the reading database, and transmits the read-out reading data to the terminal device together with the mail data.

11. A terminal device having a memory for registering a predetermined amount of Japanese font data, a communication unit for communicating with a mail server at a remote place and a display unit for displaying mail data received from the mail server by the communication unit, comprising:
a display control unit for executing a step A for reading out registered font data from the memory and a step B for displaying a character image based on read-out registered font data on the display unit for every character contained in mail data of a Japanese mail in response to reception of the mail data of the Japanese mail from the mail server by the communication unit, thereby displaying the content of the mail data; and
an additional registration unit for additionally registering font data into the memory before the processing of the display control unit when the receiving unit receives the font data concerned together with mail data.

12. A terminal device having a memory for registering a predetermined amount of Japanese font data, a communication unit for communicating with a mail server at a remote place and a display unit for displaying mail data received from the mail server by the communication unit, comprising:
a display control unit for executing a step A for reading out registered font data form the memory and a step B for displaying a character image based on read-out registered font data on the display unit for every character contained in mail data of a Japanese mail in response to reception of the mail data of the Japanese mail from the mail server by the communication unit, thereby displaying the content of the mail data, wherein when the receiving unit receives reading data together with the mail data, the display control unit is set to read out registered font data of a character constituting the reading data concerned in the step A for the character corresponding to the reading data.

13. A terminal device having a memory for registering a predetermined amount of Japanese font data, a communication unit for communicating with a mail server at a remote place and a display unit for displaying mail data received from the mail server by the communication unit, comprising:
a display control unit for executing a step A for reading out registered font data form the memory and a step B for displaying a character image based on read-out registered font data on the display unit for every character contained in mail data of a Japanese mail in response to reception of the mail data of the Japanese mail from the mail server by the communication unit, thereby displaying the content of the mail data, wherein image information different for every character type as a no-font symbol indicating that there is no registered font data is registered in the memory, and when a character for which the corresponding font data is unregistered is processed in the step A, the display control unit identifies the character type of the character from a character code of the character concerned, and reads out image information of a no-font symbol corresponding to the character type thus identifies.

14. A program for a terminal device including a memory in which a predetermined amount of Japanese font data can be registered, a communication unit for communicating with a mail server at a remote place, a display unit for displaying mail data received from the mail server by the communication unit, and a controller containing a computer, the program being installed in the controller to make the computer function as a display control unit for executing a step A for reading out registered font data from the memory and a step B for displaying a character image based on read-out registered font data on the display unit for every character contained in received mail data, thereby displaying the content of the mail data and an additionally registering unit for additionally registering received font data into the memory before the processing of the display control unit when the communication unit receives the font data together with the mail data.

15. A program for a terminal device including a memory in which a predetermined amount of Japanese font data can be registered, a communication unit for communicating with a mail server at a remote place, a display unit for displaying mail data received from the mail server by the communication unit, and a controller containing a computer, the program being installed in the controller to make the computer function as a display control unit for executing a step A for reading out registered font data from the memory and a step B for displaying a character image based on read-out registered font data on the display unit for every character contained in received mail data, thereby displaying the content of the mail data, when the communication unit receives reading data together with the mail data, the display control unit executing the processing of reading out registered font data of the character constituting the reading data in the step A for the character corresponding to the reading data.

16. A program for a terminal device including a memory in which a predetermined amount of Japanese font data can be registered, a communication unit for communicating with a mail server at a remote place, a display unit for displaying mail data received from the mail server by the communication unit, and a controller containing a computer, the program being installed in the controller to make the computer function as a registration unit for registering in the memory image information different for every character type as a no-font symbol indicating that there is no registered font data, and a display control unit for executing a step A for reading out registered font data from the memory and a step B for displaying a character image based on a read-out registered font data on the display unit for every character contained in received mail data, thereby displaying the content of the mail data, when a character for which the corresponding font data is unregistered is processed in the step A, the display control unit identifying a character type from the character code of the character concerned, and reading out the image information of the no-font symbol corresponding to the character type thus identified.

17. The mail data processing method according to claim 2, further comprising the step of wherein in the mail server, when plural characters for which the corresponding font data are unregistered are extracted, selecting characters for which corresponding font data are transmitted under a condition that a transmission amount of the font data is within a predetermined value.

18. The mail data processing method according to claim 2, further comprising the steps of:
individually registering in the mail server the management database for every terminal device, and
when an additionally registered list of the font data is received from the terminal device, renewing in the mail server the corresponding management database by using the list concerned, wherein the processing of transmitting the list of the additionally registered font data to the mail server is executed in the terminal device.

19. The mail data processing method according to claim 3, further comprising the steps of:
individually registering in the mail server the management database for every terminal device, and
when an additionally registered list of the font data is received from the terminal device, renewing in the mail server the corresponding management database by using the list concerned, wherein the processing of transmitting the list of the additionally registered font data to the mail server is executed in the terminal device.

20. The mail data processing method according to claim 2, further comprising the steps of:
wherein in the terminal device, setting the use frequency information to the additionally registered font data;
renewing the use frequency information in association with use of the font data concerned in the display processing of the mail data; and
deleting font data whose use frequency is lowest when the amount of the registered font data exceeds a predetermined limit value.

21. The mail data processing method according to claim 3, further comprising the steps of:
wherein in the terminal device, setting the use frequency information to the additionally registered font data;
renewing the use frequency information in association with use of the font data concerned in the display processing of the mail data; and
deleting font data whose use frequency is lowest when the amount of the registered font data exceeds a predetermined limit value.

22. The mail data processing method according to claim 4, further comprising the steps of:
wherein in the terminal device, setting the use frequency information to the additionally registered font data;
renewing the use frequency information in association with use of the font data concerned in the display processing of the mail data; and
deleting font data whose use frequency is lowest when the amount of the registered font data exceeds a predetermined limit value.

* * * * *